US011606385B2

(12) United States Patent
Meyer et al.

(10) Patent No.: US 11,606,385 B2
(45) Date of Patent: Mar. 14, 2023

(54) BEHAVIORAL DNS TUNNELING IDENTIFICATION

(71) Applicant: PALO ALTO NETWORKS (ISRAEL ANALYTICS) LTD., Tel Aviv (IL)

(72) Inventors: Aviad Meyer, Hod-Hasharon (IL); Jonathan Allon, Haifa (IL); Rony Brailovsky, Tel Aviv-Jaffa (IL)

(73) Assignee: PALO ALTO NETWORKS (ISRAEL ANALYTICS) LTD., Tel Aviv (IL)

( * ) Notice: Subject to any disclaimer, the term of this patent is extended or adjusted under 35 U.S.C. 154(b) by 459 days.

(21) Appl. No.: 16/789,442

(22) Filed: Feb. 13, 2020

(65) Prior Publication Data

US 2021/0258325 A1 Aug. 19, 2021

(51) Int. Cl.
G06F 13/20 (2006.01)
H04L 61/2592 (2022.01)
H04L 9/40 (2022.01)
H04L 61/4511 (2022.01)

(52) U.S. Cl.
CPC .......... *H04L 63/145* (2013.01); *G06F 13/20* (2013.01); *H04L 61/2592* (2013.01); *H04L 61/4511* (2022.05); *H04L 63/1425* (2013.01)

(58) Field of Classification Search
None
See application file for complete search history.

(56) References Cited

U.S. PATENT DOCUMENTS

| 8,245,304 | B1 | 8/2012 | Chen et al. |
| 8,555,388 | B1 | 10/2013 | Wang et al. |
| 8,561,188 | B1 | 10/2013 | Wang et al. |
| 8,677,487 | B2 | 3/2014 | Balupari et al. |
| 8,826,434 | B2 | 9/2014 | Merza |
| 8,966,625 | B1 | 2/2015 | Zuk et al. |
| 9,038,178 | B1 | 5/2015 | Lin et al. |
| 9,130,982 | B2 | 9/2015 | Gottlieb et al. |
| 9,147,071 | B2 | 9/2015 | Sallam |
| 9,154,516 | B1 | 10/2015 | Vaystikh et al. |

(Continued)

OTHER PUBLICATIONS

U.S. Appl. No. 16/798,466 Office Action dated Nov. 24, 2021.

(Continued)

*Primary Examiner* — Mohamed Ibrahim
(74) *Attorney, Agent, or Firm* — Kligler & Associates Patent Attorneys Ltd

(57) ABSTRACT

Methods, apparatus and computer software products for protecting a computing system implement embodiments of the present invention that include extracting, from data traffic transmitted over a data network connecting a plurality of computing devices to multiple Internet hosting services, respective sets of transmissions from the computing devices to the Internet hosting services, and identifying, in a given set of the transmissions from a given computing device, multiple domain name system (DNS) requests for an identical second-level domain (2LD) and for different respective sub-domains within the 2LD. A number of the different sub-domains within the 2LD and a data size of the multiple DNS requests are computed, and when the number of the different sub-domains and the data size of the multiple DNS requests exceed a predefined criterion, a preventive action is initiated to inhibit DNS tunneling from at least the given computing device.

23 Claims, 6 Drawing Sheets

(56) References Cited

U.S. PATENT DOCUMENTS

| | | | |
|---|---|---|---|
| 9,215,239 B1 | 12/2015 | Wang et al. | |
| 9,342,691 B2 | 5/2016 | Maestas | |
| 9,378,361 B1 | 6/2016 | Yen et al. | |
| 9,386,028 B2 | 7/2016 | Altman | |
| 9,462,008 B2 | 10/2016 | Bartos et al. | |
| 10,148,690 B2 | 12/2018 | Shen et al. | |
| 10,257,295 B1 | 4/2019 | Alpert et al. | |
| 10,425,436 B2 | 9/2019 | Firstenberg et al. | |
| 10,574,681 B2 | 12/2020 | Meshi et al. | |
| 2003/0110379 A1 | 6/2003 | Ylonen et al. | |
| 2007/0064617 A1 | 3/2007 | Reves | |
| 2007/0143852 A1 | 6/2007 | Keanini et al. | |
| 2008/0082662 A1 | 4/2008 | Dandliker et al. | |
| 2008/0256622 A1 | 10/2008 | Neystadt et al. | |
| 2009/0119397 A1 | 5/2009 | Neerdaels | |
| 2011/0016525 A1 | 1/2011 | Jeong et al. | |
| 2011/0239300 A1 | 9/2011 | Klein et al. | |
| 2011/0283357 A1 | 11/2011 | Pandrangi et al. | |
| 2011/0302656 A1* | 12/2011 | El-Moussa | H04L 63/1416 726/24 |
| 2012/0158626 A1 | 6/2012 | Zhu et al. | |
| 2013/0007233 A1 | 1/2013 | Lv et al. | |
| 2013/0031625 A1 | 1/2013 | Lim | |
| 2014/0007238 A1 | 1/2014 | Magee et al. | |
| 2014/0165207 A1 | 6/2014 | Engel et al. | |
| 2015/0128263 A1 | 5/2015 | Raugas et al. | |
| 2015/0170072 A1 | 6/2015 | Grant et al. | |
| 2015/0172300 A1 | 6/2015 | Cochenour | |
| 2015/0358344 A1 | 12/2015 | Mumcuoglu et al. | |
| 2015/0373039 A1 | 12/2015 | Wang | |
| 2015/0373043 A1 | 12/2015 | Wang et al. | |
| 2016/0042287 A1 | 2/2016 | Eldardiry et al. | |
| 2016/0057165 A1 | 2/2016 | Thakar et al. | |
| 2016/0099852 A1* | 4/2016 | Cook | H04L 43/08 709/224 |
| 2016/0104203 A1 | 4/2016 | Roosenraad et al. | |
| 2016/0134651 A1 | 5/2016 | Hu et al. | |
| 2016/0150004 A1 | 5/2016 | Hentunen | |
| 2016/0156655 A1 | 6/2016 | Lotem et al. | |
| 2016/0234167 A1 | 8/2016 | Engel et al. | |
| 2016/0294773 A1* | 10/2016 | Yu | H04L 63/029 |
| 2016/0352772 A1 | 12/2016 | O'Connor | |
| 2016/0366159 A1* | 12/2016 | Chiba | H04L 63/1458 |
| 2017/0026398 A1 | 1/2017 | Mumcuoglu et al. | |
| 2017/0041333 A1* | 2/2017 | Mahjoub | G06F 16/951 |
| 2017/0126718 A1 | 5/2017 | Baradaran et al. | |
| 2018/0013778 A1 | 1/2018 | Lim et al. | |
| 2018/0139224 A1 | 5/2018 | Amell et al. | |
| 2018/0288073 A1 | 10/2018 | Hopper | |
| 2018/0351930 A1 | 12/2018 | Kim et al. | |
| 2019/0007440 A1 | 1/2019 | Lavi et al. | |
| 2019/0081952 A1 | 3/2019 | Wood | |
| 2019/0190931 A1 | 6/2019 | Levin et al. | |
| 2019/0250911 A1 | 8/2019 | Lospinuso et al. | |
| 2019/0319981 A1 | 10/2019 | Meshi et al. | |
| 2019/0387005 A1 | 12/2019 | Zawoad et al. | |
| 2020/0007548 A1 | 1/2020 | Sanghavi et al. | |
| 2020/0014714 A1* | 1/2020 | Mortensen | H04L 63/1483 |
| 2020/0177625 A1 | 6/2020 | Rouvinen | |
| 2020/0213333 A1 | 7/2020 | Deutschmann et al. | |
| 2021/0014198 A1 | 1/2021 | Amoudi et al. | |
| 2021/0136037 A1 | 5/2021 | Balasubramaniam | |

OTHER PUBLICATIONS

U.S. Appl. No. 16/917,949 Office Action dated Mar. 21, 2022.
U.S. Appl. No. 16/798,466 Office Action dated May 11, 2022.
Wei et al., "Identifying New Spam Domains by Hosting IPS: Improving Domain Blacklisting", Dept. of Computer and Information Sciences, University of Alabama at Birmingham, pp. 1-8, Jan. 2010.
Iana., "Autonomous System (AS) Numbers", 1 page, Jul. 29, 2016.
Gross et al., "FIRE: Finding Rogue nEtworks", Annual Conference on Computer Security Applications, pp. 1-10, Dec. 7-11, 2009.
Frosch., "Mining DNS-related Data for Suspicious Features", Ruhr Universitat Bochum, Master's Thesis, pp. 1-88, Dec. 23, 2011.
Bilge et at., "Disclosure: Detecting Botnet Command and Control Servers Through Large-Scale NetFlow Analysis", Annual Conference on Computer Security Applications, pp. 1-10, Dec. 3-7, 2012.
Blum., "Combining Labeled and Unlabeled Data with Co-Training", Carnegie Mellon University, Research Showcase @ CMU, Computer Science Department, pp. 1-11, Jul. 1998.
Felegyhazi et al., "On the Potential of Proactive Domain Blacklisting", LEET'10 Proceedings of the 3rd USENIX Conference on Large-scale exploits and emergent threats, pp. 1-8, San Jose, USA, Apr. 27, 2010.
Konte et al., "ASwatch: An AS Reputation System to Expose Bulletproof Hosting ASes", SIGCOMM, pp. 625-638, Aug. 17-21, 2015.
Markowitz, N., "Bullet Proof Hosting: A Theoretical Model", Security Week, pp. 1-5 ,Jun. 29, 2010, downloaded from http://www.infosecisland.com/blogview/4487-Bullet-Proof-Hosting-A-Theoretical-Model.html.
Markowitz, N., "Patterns of Use and Abuse with IP Addresses", Security Week, pp. 1-4, Jul. 10, 2010, downloaded from http://infosecisland.com/blogview/5068-Patterns-of-Use-and-Abuse-with-IP-Addresses.html.
Goncharov,M., "Criminal Hideouts for Lease: Bulletproof Hosting Services", Forward-Looking Threat Research (FTR) Team, A TrendLabsSM Research Paper, pp. 1-28, Jul. 3, 2015.
Bilge at al., "Exposure: Finding Malicious Domains Using Passive DNS Analysis ", NDSS Symposium, pp. 1-17 Feb. 6-9, 2011.
Xu et al., "We know it before you do: Predicting Malicious Domains", Virus Bulletin Conference, pp. 73-33, Sep. 2014.
U.S. Appl. No. 16/798,466 Office Action dated Aug. 25, 2022.
U.S. Appl. No. 16/798,466 Office Action dated Jan. 19, 2023.

* cited by examiner

BEHAVIORAL DNS TUNNELING IDENTIFICATION

FIELD OF THE INVENTION

The present invention relates generally to computer security and networks, and particularly to detecting a Domain Name System (DNS) tunneling attack on a network.

BACKGROUND OF THE INVENTION

In many computers and network systems, multiple layers of security apparatus and software are deployed in order to detect and repel the ever-growing range of security threats. At the most basic level, computers use anti-virus software to prevent malicious software from running on the computer. At the network level, intrusion detection and prevention systems analyze and control network traffic to detect and prevent malware from spreading through the network.

The description above is presented as a general overview of related art in this field and should not be construed as an admission that any of the information it contains constitutes prior art against the present patent application.

SUMMARY OF THE INVENTION

There is provided, in accordance with an embodiment of the present invention, a method for protecting a computing device, including extracting, from data traffic transmitted over a data network connecting a plurality of computing devices to multiple Internet hosting services, respective sets of transmissions from the computing devices to the Internet hosting services, identifying, in a given set of the transmissions from a given computing device, multiple domain name system (DNS) requests for an identical second-level domain (2LD) and for different respective sub-domains within the 2LD, computing, by a processor, a number of the different sub-domains within the 2LD and a data size of the multiple DNS requests, and when the number of the different sub-domains and the data size of the multiple DNS requests exceed a predefined criterion, initiating a preventive action to inhibit DNS tunneling from at least the given computing device.

In one embodiment, the method includes analyzing the given set of transmissions to identify further transmissions to the different sub-domains within the 2LD following the DNS requests submitted with respect to the different sub-domains, wherein initiating the preventive action includes intervening in the transmissions by the given computing device when there are no further transmissions to at least some of the different sub-domains within the 2LD following the DNS requests.

In another embodiment, the specified threshold includes a specified time period.

In an additional embodiment, the method includes computing, by the processor, a number of the transmissions to the 2LD, and when the computed number of transmissions to the 2LD exceeds a predefined 2LD criterion, initiating the preventive action to inhibit DNS tunneling from at least the given computing device.

In a further embodiment, the method includes identifying, in a given transmission, a DNS request for a given domain name, and determining, by the processor, an age of the domain name, and when the age of the domain name does not meet a predefined age criterion, initiating the preventive action to inhibit DNS tunneling transmissions to at least the given domain name.

In a supplemental embodiment, the method includes identifying, by the processor, a first given transmission including a first DNS request for a given domain name transmitted by a first given computing device at a first time, and when failing to identify a second given transmission including a second DNS request for the given domain name transmitted by a second given computing device at a second time previous to the first given time, initiating the preventive action to inhibit DNS tunneling transmissions to at least the given domain name.

In another embodiment, the method includes identifying, by the processor, a DNS request in a given transmission from a given computing device, and when the given computing device does not include a local DNS server, initiating the preventive action to inhibit DNS tunneling transmissions from at least the given computing device.

In one embodiment, the method includes identifying, by the processor, a plurality of the transmissions including DNS requests for a 2LD, and determining a number of unique computing devices that transmitted the DNS requests for the 2LD, and when the determined number of unique computing devices does not meet a predefined 2DL criterion, initiating the preventive action to inhibit DNS tunneling transmissions to at least the given 2LD.

In an additional embodiment, the method includes identifying, in a given transmission, a DNS request for a given domain name, and determining, by the processor, whether or not the domain name is a registered domain name, and when domain name is not a registered domain name, initiating the preventive action to inhibit DNS tunneling transmissions to at least the given domain name.

In a further embodiment, the method includes identifying, by the processor, a DNS request in a given transmission from a given computing device to a given Internet hosting service, and when the given Internet hosting service does not include a public DNS server, initiating the preventive action to inhibit DNS tunneling transmissions from at least the given computing device.

In a supplemental embodiment, the method includes identifying, in a given transmission, a DNS request for a given domain name, and determining, by the processor, whether or not the domain name includes any random characters, and when domain name includes any random characters, initiating the preventive action to inhibit DNS tunneling transmissions to at least the given domain name.

There is also provided, in accordance with an embodiment of the present invention, an method for protecting a computing system, including a network interface card (NIC), and at least one processor configured: to extract, via the NIC from data traffic transmitted over a data network connecting a plurality of computing devices to multiple Internet hosting services, respective sets of transmissions from the computing devices to the Internet hosting services, to identify, in a given set of the transmissions from a given computing device, multiple domain name system (DNS) requests for an identical second-level domain (2LD) and for different respective sub-domains within the 2LD, to compute a number of the different sub-domains within the 2LD and a data size of the multiple DNS requests, and when the number of the different sub-domains and the data size of the multiple DNS requests exceed a predefined criterion, to initiate a preventive action to inhibit DNS tunneling from at least the given computing device.

There is additionally provided, in accordance with an embodiment of the present invention, a computer software product for protecting a computing system, the product including a non-transitory computer-readable medium, in which program instructions are stored, which instructions, when read by a computer, cause the computer to extract, from data traffic transmitted over a data network connecting a plurality of computing devices to multiple Internet hosting services, respective sets of transmissions from the computing devices to the Internet hosting services, to identify, in a given set of the transmissions from a given computing device, multiple domain name system (DNS) requests for an identical second-level domain (2LD) and for different respective sub-domains within the 2LD, to compute a number of the different sub-domains within the 2LD and a data size of the multiple DNS requests, and when the number of the different sub-domains and the data size of the multiple DNS requests exceed a predefined criterion, to initiate a preventive action to inhibit DNS tunneling from at least the given computing device.

There is further provided, in accordance with an embodiment of the present invention, a method for protecting a computing system, including extracting, from data traffic transmitted over a data network connecting a plurality of computing devices to multiple Internet hosting services, respective sets of transmissions from the computing devices to the multiple Internet hosting services, identifying, in a given set of the transmissions from a given computing device, a first given transmission including a domain name system (DNS) request for a given domain, analyzing, by a processor, the sets of the transmissions to identify a second given transmission to the given domain that was transmitted prior to the first given transmission, analyzing the given set of the transmissions to identify a third given transmission to the given domain that was transmitted subsequent to the first given transmission, and when identifying the second and the third given transmissions, initiating a preventive action to inhibit DNS tunneling from at least the given computing device.

There is also provided, in accordance with an embodiment of the present invention, an apparatus method for protecting a computing system, including a network interface card (NIC), and at least one processor configured to extract, via the NIC from data traffic transmitted over a data network connecting a plurality of computing devices to multiple Internet hosting services, respective sets of transmissions from the computing devices to the multiple Internet hosting services, to identify, in a given set of the transmissions from a given computing device, a first given transmission including a domain name system (DNS) request for a given domain, to analyze the sets of the transmissions to identify a second given transmission to the given domain that was transmitted prior to the first given transmission, to analyze the given set of the transmissions to identify a third given transmission to the given domain that was transmitted subsequent to the first given transmission, and when identifying the second and the third given transmissions, to initiate a preventive action to inhibit DNS tunneling from at least the given computing device.

There is additionally provided, in accordance with an embodiment of the present invention, a computer software product for protecting a computing system, the product including a non-transitory computer-readable medium, in which program instructions are stored, which instructions, when read by a computer, cause the computer to extract, from data traffic transmitted over a data network connecting a plurality of computing devices to multiple Internet hosting services, respective sets of transmissions from the computing devices to the multiple Internet hosting service, to identify, in a given set of the transmissions from a given computing device, a first given transmission including a domain name system (DNS) request for a given domain, to analyze the sets of the transmissions to identify a second given transmission to the given domain that was transmitted prior to the first given transmission, to analyze the given set of the transmissions to identify a third given transmission to the given domain that was transmitted subsequent to the first given transmission, and when identifying the second and the third given transmissions, to initiate a preventive action to inhibit DNS tunneling from at least the given computing device.

BRIEF DESCRIPTION OF THE DRAWINGS

The disclosure is herein described, by way of example only, with reference to the accompanying drawings, wherein.

DETAILED DESCRIPTION OF EMBODIMENTS

Figure 1:
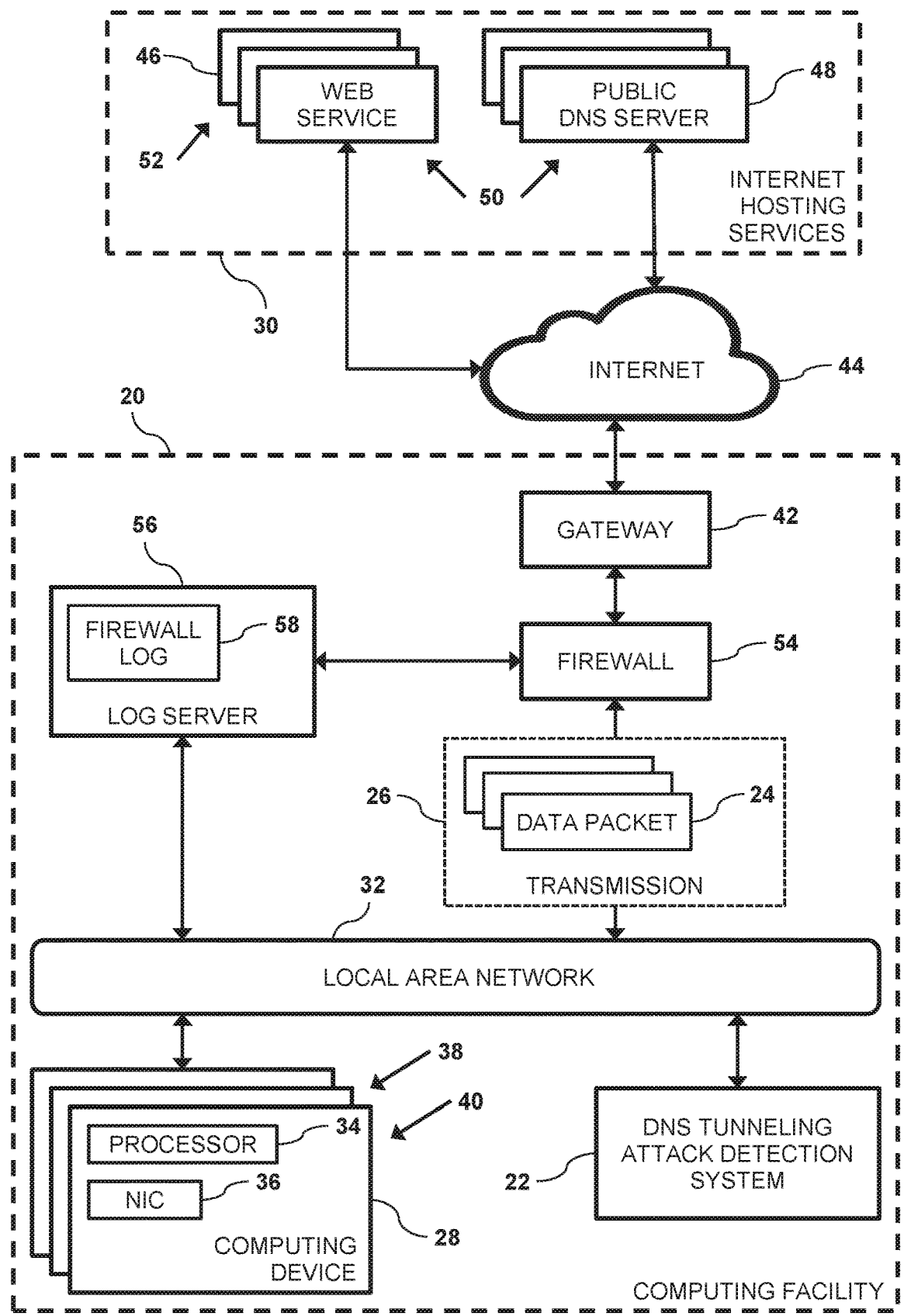
FIG. 1 is a block diagram that schematically shows a computing facility comprising a Domain Name System (DNS) tunneling attack detection system, in accordance with an embodiment of the present invention.

Some cyberattacks use malicious software (also known as malware) that is configured to gain unauthorized access to sensitive data stored in a computer that sits behind a corporate firewall, and to exfiltrate the sensitive data from the computer to a malicious server outside the firewall.

One example of an attack is a Domain Name System (DNS) tunneling attack that embeds the sensitive data in DNS requests. DNS is a protocol that translates human-friendly domain names (also referred to herein simply as domains), such as paloaltonetworks.com, into machine-friendly Internet Protocol (IP) addresses, such as 199.167.52.137. Since DNS is not intended for data transfer, cybercriminals can use attacks such as DNS tunneling that exploit the fact that many organizations do not monitor their DNS traffic for malicious activity.

In a DNS tunneling attack, an attacker registers a domain (e.g., badsite.com), and the name server for the registered domain points to a server belonging to the attacker. The attacker then infects a computer, which often sits behind a company's firewall, with malware. In some implementations, the malware can be configured to exfiltrate sensitive data that is stored behind the firewall by encoding the sensitive data into DNS requests (i.e., for the domain registered to the attacker) that the malware transmits to an external DNS server. DNS tunneling attacks exploit the fact that firewalls typically do not monitor and/or block DNS requests that are transmitted from computers behind the firewall to DNS servers on the other side of the firewall.

Embodiments of the present invention provide methods and systems for detecting DNS tunneling attacks that can comprise confidential data stored on a corporate network. As described hereinbelow, data traffic transmitted over a data network connecting a plurality of computing devices to multiple Internet hosting services is monitored, and DNS tunneling attacks can then be identified by analyzing the data traffic.

In one embodiment, respective sets of transmissions from the computing devices to the Internet hosting services are extracted from the data traffic, and multiple DNS requests for an identical second-level domain (2LD) and for different respective sub-domains within the 2LD are identified in a given set of the transmissions from a given computing device. A number of the different sub-domains within the 2LD and a data size of the multiple DNS requests are computed, and upon detecting that the number of the different sub-domains and the data size of the multiple DNS requests exceed a predefined criterion, a preventive action is initiated to inhibit DNS tunneling from at least the given computing device.

In another embodiment, respective sets of transmissions from the computing devices to the Internet hosting services are extracted from the data traffic, and a first given transmission comprising a DNS request for a given domain is identified in a given set of the transmissions from a given computing device. The sets of the transmissions are analyzed to identify a second given transmission to the given domain that was transmitted prior to the first given transmission, and the given set of the transmissions is analyzed to identify a third given transmission to the given domain that was transmitted subsequent to the first given transmission. Upon identifying the second and the third given transmissions, initiating a preventive action is initiated to inhibit DNS tunneling from at least the given computing device.

System Description

FIG. 1 is a block diagram that schematically shows an example of a computing facility 20 comprising a DNS tunneling attack detection system 22 that is configured to detect a DNS tunneling attack, in accordance with an embodiment of the present invention. As described hereinbelow, embodiments of the present invention aggregate data packets 24 into transmissions 26 between computing devices 28 and Internet hosting services 30, and DNS tunneling attack detection system 22 is configured to detect a DNS tunneling attack comprising multiple transmissions 26 from a given computing device 28.

Each computing device 28 may comprise any type of device (i.e., physical or virtual) that is configured to communicate over a data network such as a local area network (LAN) 32, and has an IP address assigned for this purpose. Each given computing device 28 may comprise, for example, a device processor 34 and a device network interface card 36 that couples the given computing device to LAN 32. In embodiments of the present invention each given computing device 28 may also comprise a device identifier (ID) 38 and a device role 40.

Examples of device IDs 38 include, but are not limited to, a media access control (MAC) addresses and Internet Protocol (IP) addresses that can be used to uniquely identify each of computing device 28. While at any given time, each given computing device 28 is assigned a unique IP address, the given computing device may be associated with multiple IP addresses over an extended time period. For example, the IP address for a given computing device 28 may change after a reboot of the given computing device.

Examples of roles 40 include, but are not limited to, servers (e.g., database servers and email servers), workstations and local DNS servers. In embodiments herein, a given computing device 28 whose role 40 comprises a DNS server may be referred to as a local DNS server.

Computing facility 20 may also comprise an Internet gateway 42, which couples computing facility 20 to a public network 44 such as the Internet. In the example shown in FIG. 1, Internet hosting services 30 comprise web services 46 (e.g., web sites) and public DNS servers 48 that are coupled to Internet 44.

Each of the web services and each of the DNS servers have respective IP addresses 50, and each of the web services host respective domain names 52. In operation, a given computing device 28 can communicate with a given web services 46 by first generating a DNS request comprising a given domain name 52 in order to receive a given IP address of the given web service that is hosting the given domain name.

In a first embodiment, the given computing device can transmit the DNS request to the local DNS server. If the local DNS server can identify the IP address of the web service hosting the given domain name, the local DNS server can convey a DNS request response comprising the identified IP address. If the local DNS server cannot identify the IP address of the Internet hosting service hosting the given domain name, the local DNS server forwards the DNS request to one or more public DNS servers 48 that can successfully process the DNS request.

In a second embodiment the given computing device can bypass the local DNS server, and transmit the DNS request directly to one or more public DNS servers 48 for processing. If the local and the public DNS servers cannot identify the IP address of the web service hosting the given domain name, then the given computing device will typically receive an appropriate error message.

To protect the sensitive data, computing facility 20 may also comprise a firewall 54 that controls traffic (i.e., the flow of data packets 24) between LAN 32 and Internet 44 based on predetermined security rules. For example, firewall 54 can be configured to allow computing devices 28 to convey data requests to Internet hosting services 30, and to block data requests from the Internet hosting services to the computing devices.

In some embodiments, firewall 54 can be configured to group the data packets according to the IP addresses (i.e., IDs 38 and IP addresses 50) in the data packets, such that the system processor can group together packets 24 having the same source and destination addresses or having the same source address, source port, destination address, destination port and protocol. Methods of grouping data packets 24 into transmissions 26 are described, for example, in U.S. Patent Applications 2016/0234167 and Ser. No. 15/950,234.

As shown in FIG. 1, computing facility 20 may also comprise a log server 56 that is coupled to firewall 54 and network 32. While the configuration in FIG. 1 shows log server 56 as a computing device coupled to network 32, other configurations are considered to be within the spirit and scope of the present invention. For example, log server 56 can be implemented as a cloud computing service.

Log server 56 is configured to receive, from firewall 54, details for each transmission 26, and to store the transmission details to a firewall log 58. In operation, DNS tunneling detection system 22 can query firewall log 58, as described hereinbelow. Examples of a given firewall 54 that can connect to log server 54 are the Next Generation Firewalls (e.g., PA-7080) produced by Palo Alto Networks, Inc. of 3000 Tannery Way, Santa Clara, Calif. 95054 USA. Examples of information that log server 58 can receive from firewall 54 and store to log 58 are described in Appendix 1 hereinbelow.

Figure 2:
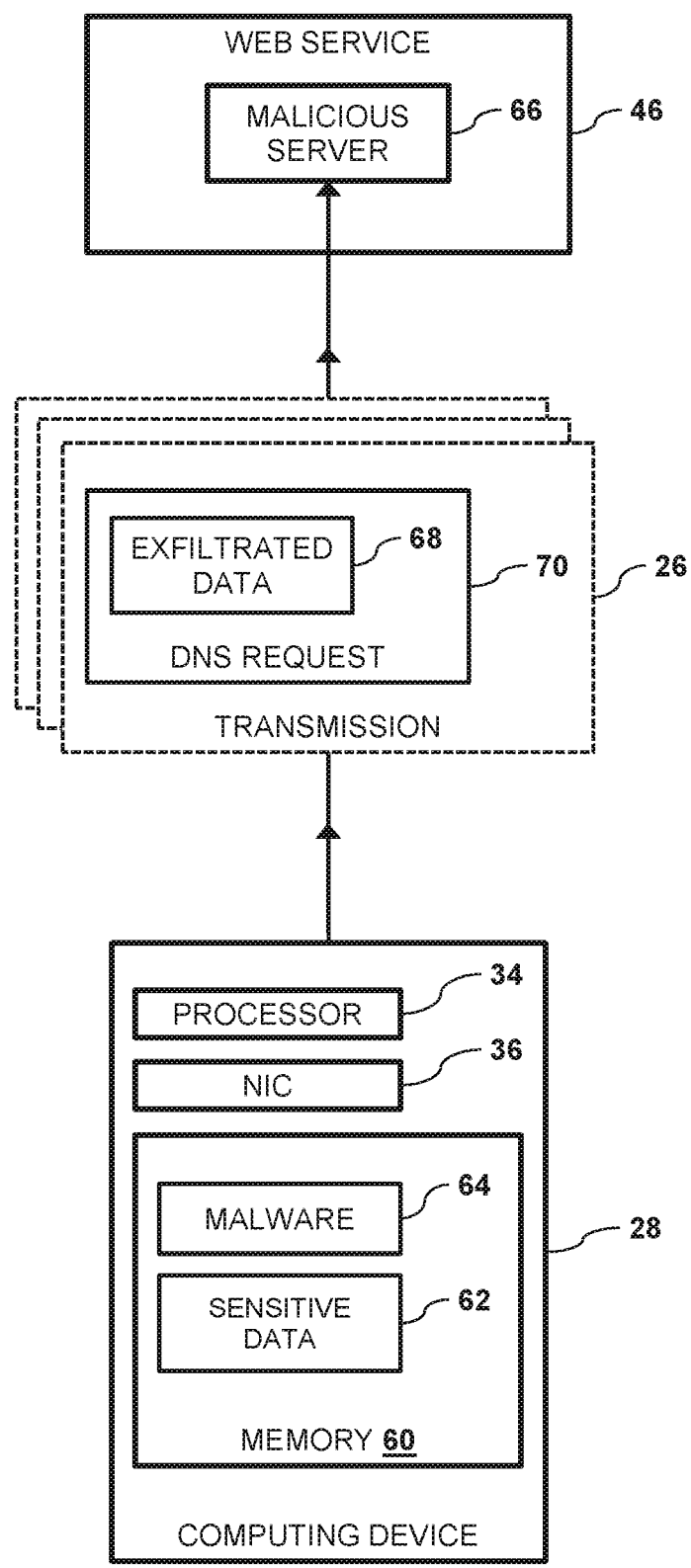
FIG. 2 is a block diagram showing an example of a DNS tunneling attack, in accordance with an embodiment of the present invention.

FIG. 2 is a block diagram showing a DNS tunneling attack on a given computing device 28, in accordance with an embodiment of the present invention. In addition to processor 34 and NIC 36, the given computing device may also comprise a device memory 60 that stores sensitive data 62 (e.g., corporate payroll data). In an alternative embodiment, the given computing device may be configured to access sensitive data 62 that is stored on a different computing device 28 (e.g., a database server) or a storage system (not shown).

In the example DNS tunneling attack shown in FIG. 2, a malware application 64 is loaded into memory 60 (e.g., in response to a user pressing on a malicious link in an email), and the malware application is configured to transmit sensitive data 62 by encoding exfiltrated data 68 (i.e., a subset of sensitive data 62) within transmissions 26 that comprise respective malicious DNS requests 70. Upon encoding the exfiltrated data into the malicious DNS requests, malware 64 transmits the transmissions comprising the malicious DNS requests to a malicious server 46 that is "masquerading" as a given public DNS server 48.

In the following example, the domain name for a given (i.e., malicious) DNS request 70 is example.com, malware 64 can exfiltrate sensitive data 62 by embedding the sensitive data as a subdomain of example.com as follows:

MRZGS3TLEBWW64TFEBXXMYLMORU4WZ.t.example.com

In this example, while MRZGS3TLEBWW64TFEBXXMYLMORU4WZ.t appears to be a subdomain of example.com, this subdomain is the exfiltrated data. To exfiltrate the sensitive data, malware application will typically break up sensitive data 62 into smaller data chunks, and embed each of the data chunks (i.e., the exfiltrated data) into respective DNS requests (also known as DNS queries) 70. In some embodiments, malware 64 can encrypt each of the data chunks prior to encoding them into their respective DNS requests 70.

While FIG. 2 shows an example of malware 64 that exfiltrates sensitive data 62 from an infected computing device 28, other types of malware 64 are considered to be within the spirit and scope of the present invention. For example, malware 64 can be configured to perform malicious activity such as destroying sensitive data 62 or locking the infected computing device until a ransom is paid.

Figure 3:
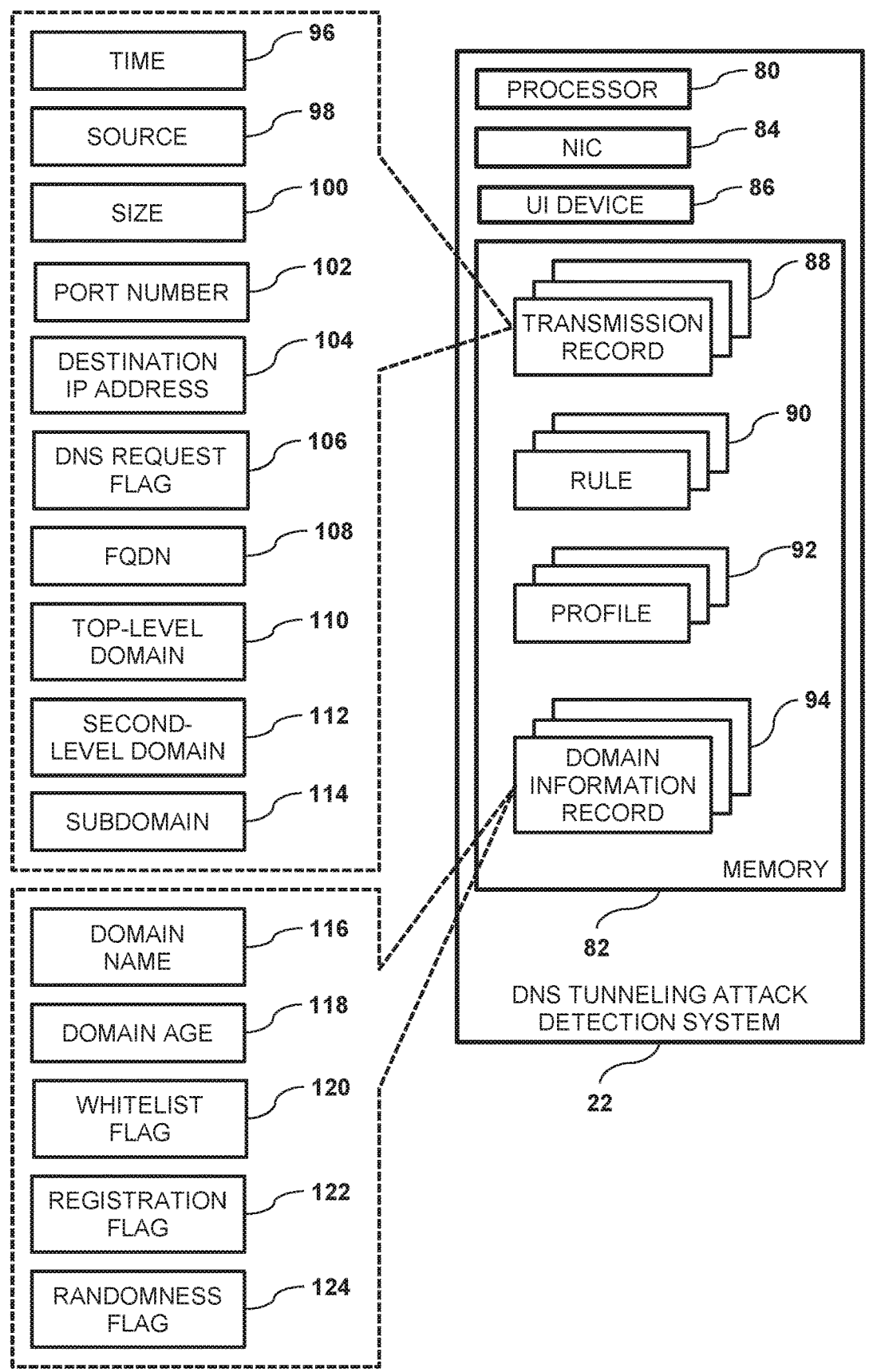
FIG. 3 is a block diagram of the DNS tunneling attack detection system, in accordance with an embodiment of the present invention.

FIG. 3 is a block diagram showing hardware and software components of DNS tunneling attack detection system 22, in accordance with an embodiment of the present invention. In some embodiments, DNS tunneling attack detection system 22 comprises a system processor 80 and a system memory 82, which are coupled by a system bus (not shown) to a network interface controller (NIC) 84 that couples the of DNS tunneling attack detection system to network 32. In some embodiments, malicious port scan detection system 22 may comprise a user interface (UI) device 86 (e.g., an LED display) or another type of output interface.

In the configuration shown in FIG. 3, memory 82 stores respective pluralities of transmission records 88, rules 90, profiles 92 and domain information records 94. Each given transmission record 88 corresponds to a given transmission 26, and comprises the following information:

A transmission time 96 indicating a date and a time of the given transmission.

A source 98 indicating the ID of a given computing device 28 that generated the given transmission.

A size 100 indicating a size (e.g., a number of bytes) of the data packets in the given transmission.

A destination port number 102 indicating a destination port for the given transmissions. Transmissions 26 comprising DNS requests 70 typically use the destination port "53". DNS tunneling attacks can exploit the fact that firewall 54 typically leaves this port open and does not monitor traffic to this destination port number.

A destination IP address 104 indicating a given IP address 50 of a given Internet hosting service 30 comprising a destination for the given transmission.

A DNS request flag 106 that indicates whether or not the given transmission comprises a given DNS request 70.

A fully qualified domain name (FQDN) 108 that is included in the given transmission if the given transmission comprises a given DNS request 70. FQDNs are complete domain name for a host on the Internet. An example of a given fully qualified domain name 108 is "ABCDE.example.com".

A top-level domain (TLD) 110 in FQDN 108 that is included in the given transmission if the given transmission comprises a given DNS request 70. The top-level domain (TLD) is the last segment of the FQDN. The TLD is the letters immediately following the final dot in an Internet address. In the example described supra where the FQDN is ABCDE.example.com, the top-level domain is "com".

A second-level domain (2LD) 112 in FQDN 108 that is included in the given transmission if the given transmission comprises a given DNS request 70. The second-level domain is a domain that is directly below a top-level domain. In the example described supra where the FQDN is ABCDE.example.com, the 2LD domain is "example".

A subdomain 114 in FQDN 108 that is included in the given transmission if the given transmission comprises a given DNS request 70. The subdomain of a given FQDN 108 is a domain above the 2LD for the given FQDN. In the example described supra where the FQDN is ABCDE.example.com, the subdomain is "ABCDE".

Each domain information record 94 corresponds to a given web service 46, and comprises the following information:

A domain name 116 for the given web service. In embodiments herein, each domain name 116 corresponds to a given domain name 52 for a give web service 46, and comprises the top-level domain and the second-level domain for a given FQDN 108. In the example described supra where the FQDN is ABCDE.example.com, the domain name is "example.com".

A domain age 118 indicating an age (e.g., a number of days) of the registration of domain name 116 for the given web service.

A whitelist flag 120 indicating whether or not the network for the given web service is whitelisted.

A registration flag 122 indicating whether or not domain name 116 for the given web service is registered (e.g., with ICANN—the Internet Corporation for Assigned Names and Numbers).

A randomness flag 124 indicating whether or not domain name 116 for the given web service comprises random characters. In some embodiments processor 80 may execute a function that analyzes a given subdomain 114 of a given domain name 116 and generates a randomness score for the given subdomain, and the system processor can set the randomness flag if the randomness score exceeds a specified threshold. This function can be used to detect random character in the given subdomain (e.g., the characters "MRZGS3TLEBWW64TFEBXXMYLMORU4WZ" in the DNS request example described supra).

As described supra, memory 82 stores respective pluralities of rules 90 and profiles 92. In embodiments of the present invention, processor 80 can apply rules 90 to transmissions records 88 in order to classify a given transmission 26 as a DNS tunneling attack. For purposes of simplicity, examples of rules 90 are described hereinbelow as rules A-L:

Rule A: This rule classifies a given transmission 26 to a given domain name 52 as more suspicious if transmission records 88 indicate that a number of DNS requests 70 for the given domain name exceeds a predefined criterion (i.e., a specified threshold, e.g., 500 within a specified time period, e.g., 20 minutes). In rule A (and any other the rules having a time-based threshold), processor 80 can use time 96 in the transmission records to determine if the DNS requests are within the specified time periods. The rationale for this rule is since a DNS tunneling attack typically splits sensitive data 62 into multiple DNS requests 70 (i.e., each of the DNS requests transmits a different subset of sensitive data 62 in the exfiltrated data in each of the DNS requests).

Rule B: This rule classifies a given transmission 26 to a given domain name 52 as suspicious if transmission records 88 comprising DNS requests 70 from a given computing device 28 for the given domain name indicate that a number of different subdomains 116 of a given second-level domain 112 for the given domain name exceeds a predefined criterion (e.g., a specified threshold, such as 500 different subdomains 116 within a specified time period, e.g., 20 minutes). The rationale for this rule is that if a DNS tunneling attack splits sensitive data 62 among multiple DNS requests 70, wherein each subset of the sensitive data is encoded as a different subdomain of the given 2LD.

Rule C: This rule classifies a given transmission 26 to a given domain name 52 as more suspicious if transmission records 88 comprising DNS requests 70 for the given domain name (regardless of the subdomains) indicate that a total volume of the transmissions (i.e., as indicated by size 100) exceeds a predefined criterion (i.e., a specified threshold, e.g., 5 KB within a specified time period, e.g., 20 minutes). The rationale for this rule is that since a DNS tunneling attack comprises exfiltrated data 68, malware 64 typically splits sensitive data 62 among multiple DNS requests 70 having large sizes 100 (due to "long" subdomains).

Rule D: This rule classifies a given transmission 26 comprising a given DNS request 70 for a given domain name 52 as more suspicious if the domain age 118 for the given domain name is less than a predefined criterion (i.e., a specified threshold, e.g., 90 days). The rationale for this rule is that registrants of malicious web services 46 typically frequently change the domain names for the web services.

Rule E: This rule classifies a given transmission 26 to a given domain name 52 as more suspicious if transmission records 88 indicate that there were no previous transmissions 26 to the given domain name 52 within a specified time period (e.g., in the 30 days prior to the given transmission). Similar to the rationale for rule D, the rationale for this rule is that registrants of malicious web services 46 typically frequently change the domain names for the web services.

Rule F: This rule classifies a given transmission 26 to a given domain name 52 as more suspicious if transmission records 88 indicate that there was no follow-up transmission 26 to a resolved IP address 50 for the given domain name within a specified time period (e.g., one minute). The rationale for this rule, is that a first given transmission 26 comprising a given DNS request 70 for a given domain name 52 (i.e., comprising a given top level domain 110 and a given second-level domain 112) is typically followed by a second given transmission 26 to the (resolved) IP address 50 for the given domain name. On the other hand, a DNS tunneling attack typically comprises a series of transmissions 26 comprising respective DNS requests 70 that do not have any follow up transmissions 26 to the resolved IP addresses.

To apply this rule, processor 80 analyzes transmission records 88 to determine if (a) there was a response (i.e., in another transmission 26) to the DNS request in the given transmission that resolved the given domain name to a given IP address 50, and there were no follow-up transmissions 26 to the given IP address within the specified time period, or (b) there were no Hypertext Transfer Protocol (HTTP) requests to the given domain name within the specified time period (e.g., one minute).

In some embodiments, processor 80 can identify the 2LD in a given transmission 26 from a given computing device, and analyze the transmissions from the given computing device so as to identify, in the given set of the transmissions, any further transmissions 26 to the different subdomains within the 2LD that follow the DNS requests submitted with respect to the different subdomains.

Rule G: This rule classifies a given transmission 26 comprising a given DNS request 70 for a given domain name 52 as more suspicious if transmission records 88 indicate that role 40 of source 98 (i.e., a given computing device 28 that transmitted the given DNS request) is not a local DNS server. The rationale for this rule is that a first given DNS request 70 that bypasses a local DNS server (e.g., is transmitted directly from a given computing device 28 to a given Internet hosting service 30) is more suspicious than a second given DNS request that the given computing device conveys via the local DNS server.

Rule H: This rule classifies a given transmission 26 comprising a given DNS request 70 for a given domain name 52 as more suspicious if transmission records 88 indicate that a number of unique computing devices 28 that transmitted transmissions 26 to second-level domains 112 matching the second-level domain of the given DNS request does not meet a predefined criterion (i.e., a specified threshold, e.g., 15 within a specified time period, e.g., 30 days). Similar to the rationale for rule D, the rationale for this rule is that registrants of malicious web services 46 typically frequently change the domain names for the web services.

Rule I: This rule classifies a given transmission 26 comprising a given DNS request 70 for a given domain name 52 as more suspicious if the whitelist flag for the given domain name indicates that the given domain name is not whitelisted. The rationale for this rule is that whitelisted domain names 52 have already been established as legitimate.

Rule J: This rule classifies a given transmission 26 comprising a given DNS request 70 for a given domain name 52 as more suspicious if the registration flag for the given domain name indicates that the given domain name is not a registered domain name. The rationale for this rule is that a first given domain name 52 that has not been registered (e.g., with ICANN) is more suspicious than a second given domain name 52 that has been registered.

Rule K: This rule classifies a given transmission 26 comprising a given DNS request 70 for a given domain name 52 as more suspicious if transmission records 88 indicate that the destination IP address for the given transmission is for a given Internet hosting service 30 that is not a given public DNS server 48. The rationale for this rule is that a first given DNS request 70 transmitted to a first given Internet hosting service 30 comprising a given public DNS server 48 is more suspicious than a second given DNS request 70 transmitted to a second given Internet hosting service 30 comprising a given public DNS server 48.

Rule L: This rule classifies a given transmission 26 comprising a given DNS request 70 for a given domain name 52 as more suspicious if the randomness flag for the given domain name indicates that the given domain name comprises a random set of characters. The rationale for this rule is that a first given DNS request 70 for a first given domain name 52 comprising random characters is more suspicious than a second given DNS request 70 for a second given domain name 52 comprising non-random characters.

In response to transmitting a first transmission 26 comprising a given DNS request 70 for a given domain name 52, processor 80 typically receives a second transmission 26 comprising a response to the given DNS request. In embodiments where the response to the given DNS request comprises the given domain name, processor 80 can use embodiments described supra to analyze the given domain name in the received response, and to classify the second transmission as more suspicious if the analyzed domain name comprises random characters.

In some embodiments, processor 80 can define a set of profiles 92 comprising respective sets of rules 90, and apply the profiles to transmission records 88 to detect a DNS tunneling attack. Using profiles 92 to detect DNS tunneling attacks is described in the description referencing FIG. 6 hereinbelow. For purposes of simplicity, examples of profiles 92 are described hereinbelow as profiles A-E:

Profile A is a second-level domain (2LD) profile that combines rule B, rule D and rule H.

Profile B is a traffic profile that combines rule A, rule C and rule F.

Profile C is a fully qualified domain name (FQDN) profile that combines rule E and rule L.

Profile D is an external profile that combines rule J and rule K.

Profile E is a noise reduction filter profile that combines rule G and rule I.

In some embodiments, the tasks of querying firewall log 58, generating transmission records 88 and domain information records 94 and applying rules 90 and/or profiles 92 to the transmission records may be split among multiple devices within computing facility 20 (e.g., computing devices 28) or external to the computing facility (e.g., a data cloud based application). In some embodiments, the functionality of some or all of computing devices 28 and/or DNS tunneling attack detection system 22 may be deployed in computing facility 20 as virtual machines.

Examples of memories 60 and 82 include dynamic random-access memories and non-volatile random-access memories. In some embodiments, the memories may comprise non-volatile storage devices such as hard disk drives and solid-state disk drives.

Processors 34 and 80 comprise general-purpose central processing units (CPU) or special-purpose embedded processors, which are programmed in software or firmware to carry out the functions described herein. This software may be downloaded to computing devices 28 and DNS tunneling attack detection system 22 in electronic form, over a network, for example. Additionally or alternatively, the software may be stored on tangible, non-transitory computer-readable media, such as optical, magnetic, or electronic memory media. Further additionally or alternatively, at least some of the functions of processors 34 and 80 may be carried out by hard-wired or programmable digital logic circuits.

DNS Tunneling Attack Detection

The descriptions hereinbelow referencing the flow diagrams presented in FIGS. 4-6 describe analyzing transmissions 26 to detect DNS tunneling attacks. As described supra, each transmission record 88 corresponds to a given transmission 26. Therefore, in embodiments described hereinbelow, processor 80 analyzes transmissions 26 by analyzing the corresponding transmission records 88.

Figure 4:
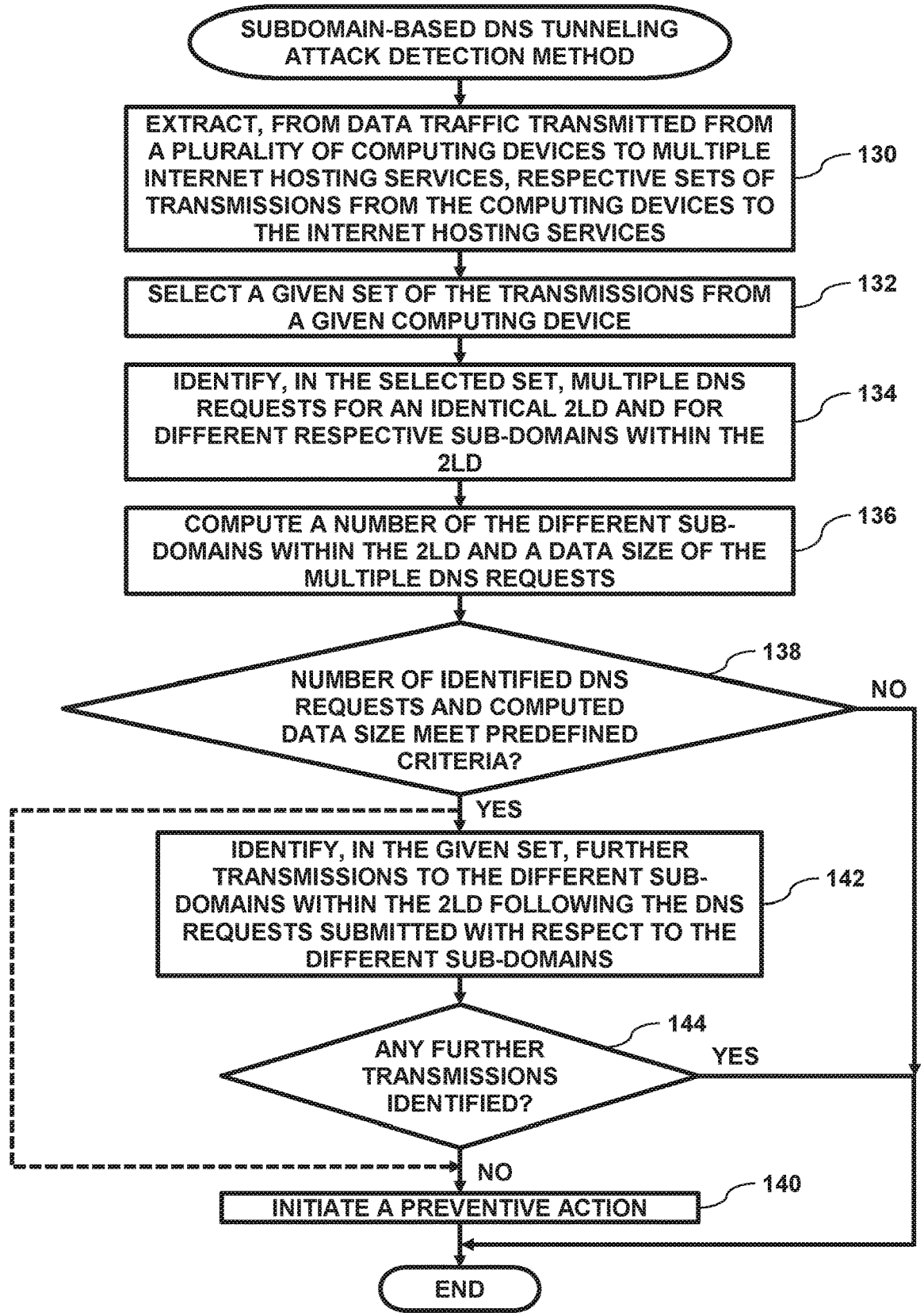
FIG. 4 is a flow diagram that schematically illustrates a method of using a first set of rules to detect DNS tunneling attacks, in accordance with an embodiment of the present invention.

FIG. 4 is a flow diagram that schematically illustrates a method of using a first set of rules 90 to detect a DNS tunneling attack in computing facility 20, in accordance with an embodiment of the present invention. In this embodiment, the first set of the rules comprises rule B, rule C and rule F.

In an extraction step 130, processor 80 communicates with NIC 84 to extract, from data traffic comprising data packets 24 transmitted from a plurality of computing devices 28 to multiple Internet hosting services 30 (e.g., web sites 46), respective sets of transmissions 26 from the computing devices to the Internet hosting services. Extracting transmissions 26 from data packets is described supra. In some embodiments, processor 80 can extract the sets of transmissions 26 by querying firewall log 58. Upon extracting transmissions, processor 80 can store details of the transmissions to transmission records 88.

In a selection step 132, processor 80 selects a given set of transmissions 26 from a given computing device 28, and in a first identification step 134, the system processor identifies, in the selected set, multiple transmissions 26 comprising DNS requests 70 for an identical 2LD 112, and for different respective sub-domains 114 within the (i.e., identical) 2LD. In some embodiments, processor 80 can determine that a given transmission 26 comprises a given DNS request 70 by identifying, in the transmission record corresponding to the given transmission, that the destination port number is "53", and that the destination IP address is an IP address in a list (not shown) of public DNS servers 48. Upon determining that the given transmission comprises a given DNS request 70, processor 80 can set the DNS request flag in the corresponding transmission record (i.e., to flag the given transmission as a DNS request).

In one embodiment, processor 80 can determine that the given transmission comprises a given DNS request 70 by detecting a first transmission 26 from a given computing device 28 to a given fixed (public or private) IP address 50 and a subsequent second transmission 26 from the given IP address to the given computing device, wherein the first transmission comprises a User Datagram Protocol request, and wherein the second transmission comprises a User Datagram Protocol (UDP) response. In this embodiment, processor 80 can determine that the first given transmission comprises a given DNS request 70. Typically, the destination port (i.e., port 102) for first given transmission is "53".

In a computation step 136, processor 80 computes, for the subset of the transmission records selected in step 134, a number of different subdomains 114 and a data size having the same 2LD 112, and computes a data size of the transmissions that comprise DNS requests 70 to the different subdomains in the same 2LD. To compute the data size, processor 80 can identify the transmission records for the DNS requests to the different subdomains in the same 2LD, and compute a total data size (as indicated by sizes 100) of the identified transmission records.

In a first comparison step 138, processor 80 applies rules B and C to the transmission records identified in step 136. If the number of DNS requests identified in step 134 meets a request criterion (e.g., 500 in 20 minutes, as described supra) and the data size meets a size criterion (e.g., 5 KB in 20 minutes, as described supra), then the in a first embodiment, the method continues with an action step 140, where processor 80 initiates a preventive action inhibit DNS tunneling from at least the given computing device, and the method ends. Initiating preventive actions is described hereinbelow.

In a second embodiment, if processor 80 detects that the number of DNS requests identified in step 134 is greater than the request threshold (i.e., rule and the data size exceeds the size threshold, then in a second identification step 142, processor 88 apply rule F to analyze the given set of the transmissions selected in step 132 in order to identify, in the given set of the transmissions, any further transmissions 26 to the different subdomains 114 within the 2LD that follow the DNS requests submitted with respect to the different subdomains 114.

Continuing with the second embodiment with a second decision step 144, if processor 80 does not detect any further transmissions (i.e., in step 142), then the method continues with step 140. However, if processor 80 detects any further transmissions in step 142, then the method ends. Returning to step 138, if the number of DNS requests identified in step 134 does not meet the request criterion and the data size does not meet the size criterion (e.g., 5 KB in 20 minutes, as described supra), then the method ends FIG. 5 is a flow diagram that schematically illustrates a method of using a second set of rules 90 to detect DNS tunneling attacks, in accordance with an embodiment of the present invention. In this embodiment, the second set of the rules comprises rule E and rule F.

In an extraction step 150, processor 80 communicates with NIC 84 to extract, from data traffic comprising data packets 24 transmitted from a plurality of computing devices 28 to multiple Internet hosting services 30 (e.g., web sites 46), respective sets of transmissions 26 from the computing devices to the Internet hosting services. Processor 80 can perform step 150 using embodiments described supra for step 130.

In an identification step 152, processor 80 identifies, in a given set of transmissions 26 from a given computing device 28, a first given transmission 26 comprising a given DNS request 70 for a given FQDN 108 comprising a given domain name 52.

In a first analysis step 154, processor 80 analyzes the extracted sets of the transmissions to identify (i.e., per rule E) a second given transmission 26 to the given domain that any given computing device 28 transmitted to the given FQDN prior to the given transmission.

In a second analysis step 156, processor 80 analyzes the given set of the transmissions from the given computing device so as to identify (i.e., per rule F) a third given transmission 26 to the given FQDN that the given computing device transmitted to the given domain subsequent to the given transmission.

In a decision step 158, if processor 80 identifies a second given transmission 26 in step 154 and identifies a third given transmission 26 in step 156, then in an action step 160, processor 80 initiates a preventive action inhibit DNS tunneling from at least the given computing device, and the method ends. Returning to step 158, the method also ends if processor 80 fails to identify a second given transmission 26 in step 154 and fails to identify a third given transmission 26 in step 156.

Figure 5:
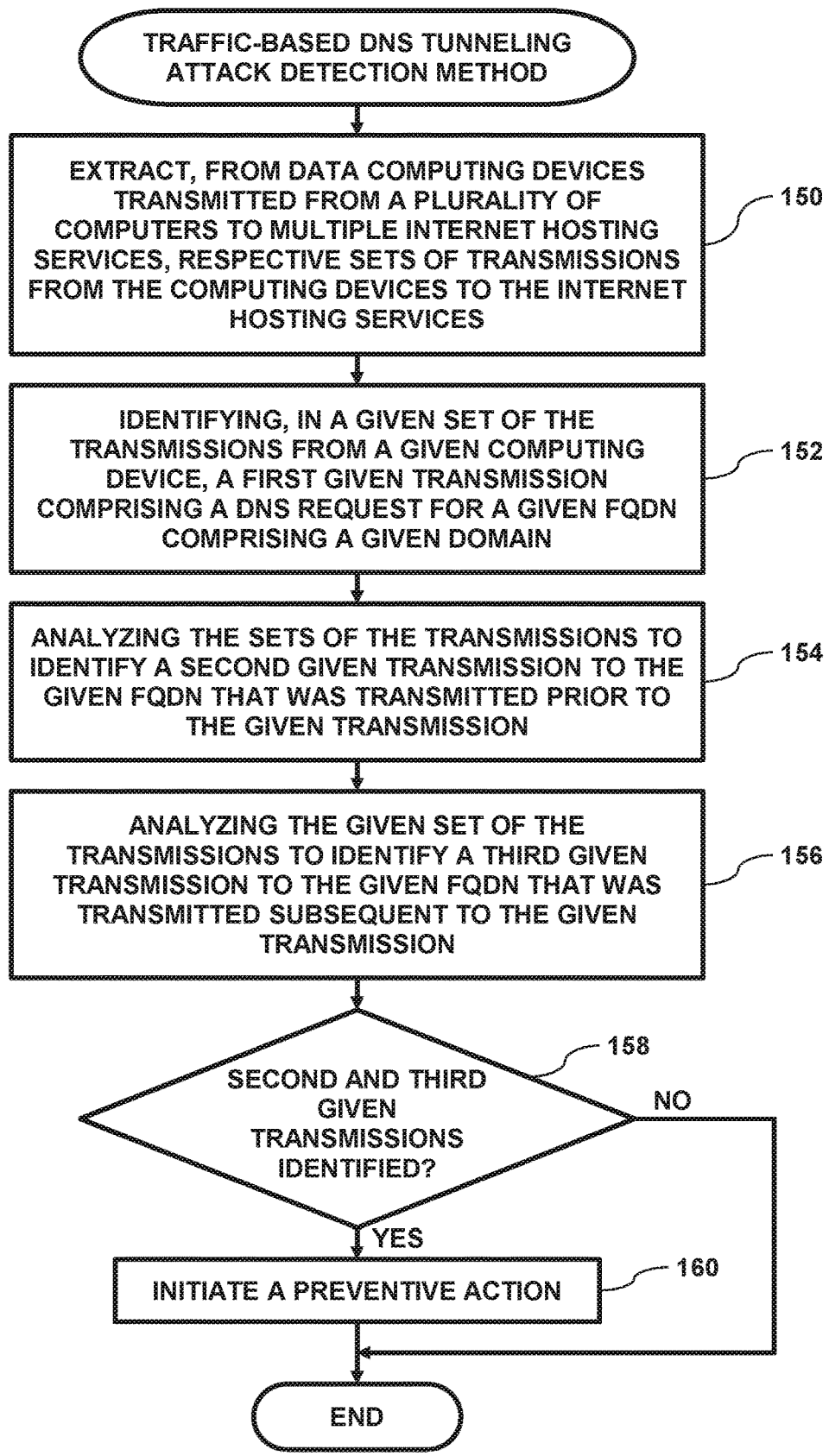
FIG. 5 is a flow diagram that schematically illustrates a method of using a second set of rules to detect DNS tunneling attacks, in accordance with an embodiment of the present invention.

While embodiments described supra referencing the flow diagram presented in FIG. 4 use rules B, C and F to detect DNS tunneling attacks, and embodiments described supra referencing the flow diagram presented in FIG. 5 use rules E and F to detect DNS tunneling attacks, using any single rule 90 to detect DNS tunneling attacks is considered to be within the spirit and scope of the present invention. In some embodiments:

Processor 80 can use respective results of rules A, G and K to initiate a preventive action to inhibit DNS tunneling from at least a given computing device 28.

Processor 80 can use respective results of rule H to initiate a preventive action to inhibit DNS tunneling to at least a given 2LD 112.

Processor 80 can use respective results of rules D, E, J and L to initiate a preventive action to inhibit DNS tunneling to at least a given domain name 52.

Figure 6:
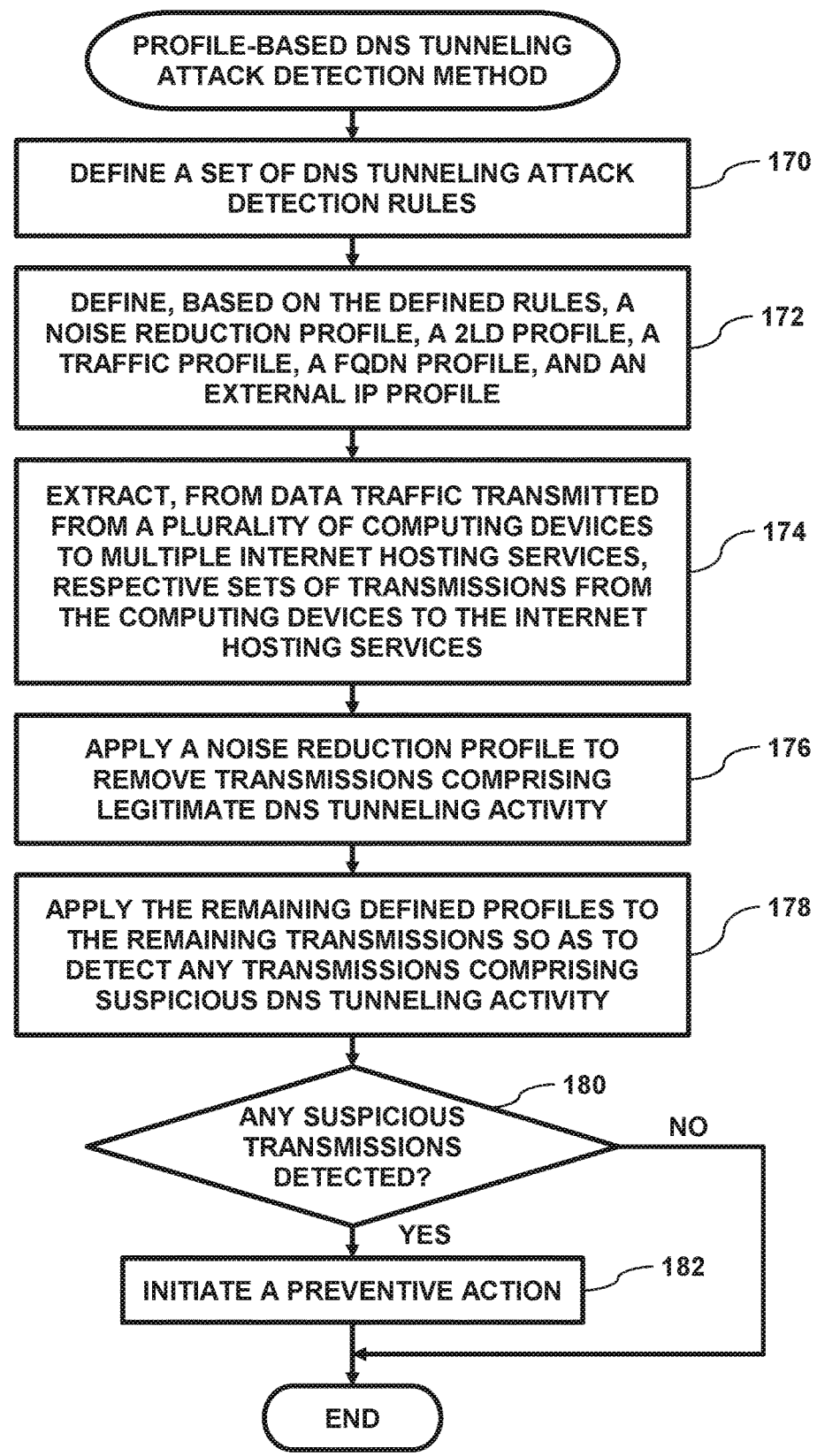
FIG. 6 is a flow diagram that schematically illustrates a method of using a set of profiles comprising respective sets of rules for detecting DNS tunneling attacks, in accordance with an embodiment of the present invention.

FIG. 6 is a flow diagram that schematically illustrates a method of using a set of profiles 92 comprising respective sets of rules 90 for detecting DNS tunneling attacks, in accordance with an embodiment of the present invention. In a first definition step 170, processor 80 receives a first input that defines rules 90, and in a second definition step 172, the system processor receives a second input defining profiles 92 comprising respective sets of the rules. As described supra, the profiles comprise 2LD profile A, traffic profile B, FQDN profile C, external profile D and noise reduction profile E.

In an extraction step 174, processor 80 communicates with NIC 84 to extract, from data traffic comprising data packets 24 transmitted from a plurality of computing devices 28 to multiple Internet hosting services 30 (e.g., web sites 46), respective sets of transmissions 26 from the computing devices to the Internet hosting services. Processor 80 can perform step 150 using embodiments described supra for step 130.

In a first application step 176, processor 80 applies noise reduction filter profile E to the extracted transmissions which applies rule I in order to remove any of the transmissions that comprise legitimate (i.e., non-malicious) DNS tunneling activity. For example, the noise reduction filter can identify and remove transmissions 26 comprising DNS requests 70 that were transmitted to whitelisted domain names 52 such as spamhaus.com that use the DNS queries to provide threat intelligence.

In a second application step 178, processor applies 2LD profile A, traffic profile B, FQDN profile C and external profile D to the remaining transmissions (i.e., after applying noise reduction filter profile E) so as to detect any of the transmissions that comprise suspicious DNS tunneling activity. In some embodiments, each given rule 90 within each given profile generates a given rule score. The rule scores for each of the profiles can be combined to generate respective profile scores, and the sum of the profile scores for a given transmission 26 exceeding a specified profile score threshold indicates that the given transmission comprises suspicious DNS tunneling activity.

In a decision step 180, if processor 80 detects a given transmission 26 comprising suspicious DNS tunneling activity, then in an action step 182, processor 80 initiates a preventive action inhibit DNS tunneling from at least a given computing device 28 that transmitted the suspicious transmission, and the method ends. Returning to step 180, the method also ends if processor 80 fails to identify any suspicious transmissions 26 in step 178.

In one embodiment, processor 80 can initiate the preventive action (i.e., as presented supra in steps 140, 160 and 182) by presenting, on UI device 86, a notification to a system administrator indicating the suspected DNS tunneling activity from the given computing device, and the method ends. In another embodiment, processor 80 can instruct firewall 54 to block transmissions from the given computing device.

While embodiments herein describe processor 80 performing steps 130-144, 150-160 and 170-182 described supra, other configurations are considered to be within the spirit and scope of the present invention. For example, the steps can be performed by any combination of processor 80, any other processors in computing facility 20, or a data cloud (not shown).

Appendix 1—Firewall Log

The following is an example of some fields that DNS log server 56 can receive from firewall 54 and store to log 56:
Start Time (start): Processor 60 can store this information to time 96.
Source Address (src): Processor 60 can store this information to source 98.
Bytes Sent (bytes sent): Processor 60 can store this information to size 100.
Destination Port (dport): Processor 60 can store this information to port 102.
Destination Address (dst): Processor 60 can store this information to destination IP address 104.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for protecting a computing system, comprising:
extracting, from data traffic transmitted over a data network connecting a plurality of computing devices to multiple Internet hosting services, respective sets of transmissions from the computing devices to the Internet hosting services;
identifying, in a given set of the transmissions from a given computing device, multiple domain name system (DNS) requests for an identical second-level domain (2LD) and for different respective sub-domains within the 2LD;
computing, by a processor, a number of the different sub-domains within the 2LD and a data size of the multiple DNS requests;
comparing the computed number of the different sub-domains to a first threshold;
comparing the computed data size to a second threshold; and
when the computed number of the different sub-domains exceeds the first threshold and the data size of the multiple DNS requests exceeds the second threshold, initiating a preventive action to inhibit DNS tunneling from at least the given computing device.

2. The method according to claim 1, and comprising analyzing the given set of transmissions to identify further transmissions to the different sub-domains within the 2LD following the DNS requests submitted with respect to the different sub-domains, wherein initiating the preventive action comprises intervening in the transmissions by the given computing device when there are no further transmissions to at least some of the different sub-domains within the 2LD following the DNS requests.

3. The method according to claim 1, wherein computing the number of the different sub-domains comprises computing the number of the different sub-domains over a specified time period.

4. The method according to claim 1, and comprising computing, by the processor, a number of the transmissions to the 2LD, and when the computed number of transmissions to the 2LD exceeds a predefined 2LD criterion, initiating the preventive action to inhibit DNS tunneling from at least the given computing device.

5. The method according to claim 1, and comprising identifying, in a given transmission, a DNS request for a given domain name, and determining, by the processor, an age of the domain name, and when the age of the domain name does meet a predefined age criterion, initiating the preventive action to inhibit DNS tunneling transmissions to at least the given domain name.

6. The method according to claim 1, and comprising identifying, by the processor, a first given transmission comprising a first DNS request for a given domain name transmitted by a first given computing device at a first time, and when failing to identify a second given transmission comprising a second DNS request for the given domain name transmitted by a second given computing device at a second time previous to the first given time, initiating the preventive action to inhibit DNS tunneling transmissions to at least the given domain name.

7. The method according to claim 1, and comprising identifying, by the processor, a DNS request in a given transmission from a given computing device, and when the given computing device does not comprise a local DNS server, initiating the preventive action to inhibit DNS tunneling transmissions from at least the given computing device.

8. The method according to claim 1, and comprising identifying, by the processor, a plurality of the transmissions comprising DNS requests for a 2LD, and determining a number of unique computing devices that transmitted the DNS requests for the 2LD, and when the determined number of unique computing devices does not meet a predefined 2DL criterion, initiating the preventive action to inhibit DNS tunneling transmissions to at least the given 2LD.

9. The method according to claim 1, and comprising identifying, in a given transmission, a DNS request for a given domain name, and determining, by the processor, whether or not the domain name is a registered domain name, and when domain name is not a registered domain name, initiating the preventive action to inhibit DNS tunneling transmissions to at least the given domain name.

10. The method according to claim 1, and comprising identifying, by the processor, a DNS request in a given transmission from a given computing device to a given Internet hosting service, and when the given Internet hosting service does not comprise a public DNS server, initiating the preventive action to inhibit DNS tunneling transmissions from at least the given computing device.

11. The method according to claim 1, and comprising identifying, in a given transmission, a DNS request for a given domain name comprising a given subdomain, generating a score indicating any random characters in the given subdomain, and when the score indicates random characters in the subdomain, initiating the preventive action to inhibit DNS tunneling transmissions to at least the given domain name.

12. An apparatus for protecting a computing system, comprising:
   a network interface card (NIC); and
   at least one processor configured:
      to extract, via the NIC from data traffic transmitted over a data network connecting a plurality of computing devices to multiple Internet hosting services, respective sets of transmissions from the computing devices to the Internet hosting services,
      to identify, in a given set of the transmissions from a given computing device, multiple domain name system (DNS) requests for an identical second-level domain (2LD) and for different respective sub-domains within the 2LD,
      to compute a number of the different sub-domains within the 2LD and a data size of the multiple DNS requests,
      to compare the computed number of the different sub-domains to a first threshold,
      to compare the computed data size to a second threshold, and
      when the computed number of the different sub-domains exceeds the first threshold and the data size of the multiple DNS requests exceeds the second threshold, to initiate a preventive action to inhibit DNS tunneling from at least the given computing device.

13. The apparatus according to claim 12, wherein a given processor is further configured to analyze the given set of transmissions to identify further transmissions to the different sub-domains within the 2LD following the DNS requests submitted with respect to the different sub-domains, and wherein a given processor is configured to initiate the preventive action by intervening in the transmissions by the given computing device when there are no further transmissions to at least some of the different sub-domains within the 2LD following the DNS requests.

14. The apparatus according to claim 12, wherein a given processor is configured to compute the number of the different sub-domains by computing the number of the different sub-domains over a specified time period.

15. The apparatus according to claim 12, wherein a given processor is further configured to compute a number of the transmissions to the 2LD, and when the computed number of transmissions to the 2LD exceeds a predefined 2LD criterion, to initiate the preventive action to inhibit DNS tunneling from at least the given computing device.

16. The apparatus according to claim 12, wherein a given processor is further configured to identify, in a given transmission, a DNS request for a given domain name, and to determine an age of the domain name, and when the age of the domain name does meet a predefined age criterion, to initiate the preventive action to inhibit DNS tunneling transmissions to at least the given domain name.

17. The apparatus according to claim 12, wherein a given processor is further configured to identify a first given transmission comprising a first DNS request for a given domain name transmitted by a first given computing device at a first time, and when failing to identify a second given transmission comprising a second DNS request for the given domain name transmitted by a second given computing device at a second time previous to the first given time, to initiate the preventive action to inhibit DNS tunneling transmissions to at least the given domain name.

18. The apparatus according to claim 12, wherein a given processor is further configured to identify a DNS request in a given transmission from a given computing device, and when the given computing device does not comprise a local DNS server, to initiate the preventive action to inhibit DNS tunneling transmissions from at least the given computing device.

19. The apparatus according to claim 12, wherein a given processor is further configured to identify a plurality of the transmissions comprising DNS requests for a 2LD, and to determine a number of unique computing devices that transmitted the DNS requests for the 2LD, and when the determined number of unique computing devices does not meet a predefined 2DL criterion, to initiate the preventive action to inhibit DNS tunneling transmissions to at least the given 2LD.

20. The apparatus according to claim 12, wherein a given processor is further configured to identify, in a given transmission, a DNS request for a given domain name, and to determine whether or not the domain name is a registered domain name, and when domain name is not a registered domain name, to initiate the preventive action to inhibit DNS tunneling transmissions to at least the given domain name.

21. The apparatus according to claim 12, wherein a given processor is further configured to identify a DNS request in a given transmission from a given computing device to a given Internet hosting service, and when the given Internet hosting service does not comprise a public DNS server, to initiate the preventive action to inhibit DNS tunneling transmissions from at least the given computing device.

22. The apparatus according to claim 12, wherein a given processor is further configured to identify, in a given transmission, a DNS request for a given domain name comprising a given subdomain, to generate a score indicating any random characters in the given subdomain, and when the score indicates random characters in the subdomain, to initiate the preventive action to inhibit DNS tunneling transmissions to at least the given domain name.

23. A computer software product for protecting a computing system, the product comprising a non-transitory computer-readable medium, in which program instructions are stored, which instructions, when read by a computer, cause the computer:

to extract, from data traffic transmitted over a data network connecting a plurality of computing devices to multiple Internet hosting services, respective sets of transmissions from the computing devices to the Internet hosting services;

to identify, in a given set of the transmissions from a given computing device, multiple domain name system (DNS) requests for an identical second-level domain (2LD) and for different respective sub-domains within the 2LD;

to compute a number of the different sub-domains within the 2LD and a data size of the multiple DNS requests;

to compare the computed number of the different sub-domains to a first threshold;

to compare the computed data size to a second threshold; and when the computed number of the different sub-domains exceeds the first threshold and the data size of the multiple DNS requests exceeds the second threshold, to initiate a preventive action to inhibit DNS tunneling from at least the given computing device.

\* \* \* \* \*